(12) United States Patent
Minta

(10) Patent No.: US 10,167,974 B2
(45) Date of Patent: Jan. 1, 2019

(54) CHECK VALVES

(71) Applicant: Hamilton Sundstrand Corporation, Charlotte, NC (US)

(72) Inventor: Zbigniew Minta, Wroclaw (PL)

(73) Assignee: HAMILTON SUNDSTRAND, Charlotte, NC (US)

( * ) Notice: Subject to any disclaimer, the term of this patent is extended or adjusted under 35 U.S.C. 154(b) by 0 days.

(21) Appl. No.: 15/403,367

(22) Filed: Jan. 11, 2017

(65) Prior Publication Data

US 2017/0204984 A1     Jul. 20, 2017

(30) Foreign Application Priority Data

Jan. 14, 2016   (EP) ..................... 16461502

(51) Int. Cl.
    *F16K 27/02*   (2006.01)
    *F16K 15/03*   (2006.01)
    *F16K 47/00*   (2006.01)

(52) U.S. Cl.
    CPC ........ *F16K 27/0209* (2013.01); *F16K 15/038* (2013.01); *F16K 47/00* (2013.01)

(58) Field of Classification Search
    CPC ..... F16K 15/038; F16K 27/0209; F16K 47/00
    USPC ..................... 137/512.1, 527, 514
    See application file for complete search history.

(56) References Cited

U.S. PATENT DOCUMENTS

| | | | |
|---|---|---|---|
| 3,965,926 A | 6/1976 | Buckner | |
| 4,249,567 A | 2/1981 | Weiss | |
| RE30,532 E | 3/1981 | Buckner | |
| 4,867,199 A | 9/1989 | Marx | |
| 7,311,740 B2 | 12/2007 | Williams et al. | |
| 7,562,669 B2 | 7/2009 | McGonigle et al. | |
| 7,568,498 B2 | 8/2009 | Denike et al. | |
| 8,181,669 B2 | 5/2012 | Dehais et al. | |
| 8,726,930 B2 | 5/2014 | Barone | |
| 2016/0084393 A1* | 3/2016 | Barone | F16K 15/033 137/527 |

FOREIGN PATENT DOCUMENTS

EP       2249068 A2     11/2010

OTHER PUBLICATIONS

European Search Report for Application No. 16461502.3-1754, dated Jul. 25, 2016, 5 Pages.

\* cited by examiner

*Primary Examiner* — P. Macade Nichols

(74) *Attorney, Agent, or Firm* — Cantor Colburn LLP

(57) ABSTRACT

A check valve comprises a valve housing defining a valve opening, a pair of mounting posts arranged on opposed sides of the valve opening and a hinge pin mounted between the mounting posts. A pair of flapper elements are pivotably mounted to the hinge pin for rotation relative to the housing between an open position in which they permit fluid flow through the valve opening and a closed position in which they prevent fluid flow through the valve opening. The valve further comprises a stop mounted between the mounting posts above the hinge pin and extending across the valve opening such that the flapper elements will contact the stop in their open positions. The stop is a coil spring.

15 Claims, 6 Drawing Sheets

CHECK VALVES

FOREIGN PRIORITY

This application claims priority to European Patent Application No. 16461502.3 filed Jan. 14, 2016, the entire contents of which is incorporated herein by reference.

TECHNICAL FIELD

The present disclosure relates to check valves.

BACKGROUND

Check valves are valves that allow fluid flow in one direction therethrough and prevent flow in the opposite direction. They are widely used in a range of applications, for example in air conditioning systems, for example in aircraft air conditioning systems.

Check valves commonly include a pair of valve elements or flappers located at an opening in a valve housing. The flappers are hingedly supported on a hinge pin mounted to the valve housing for rotation between a closed position in which they lie across and close the opening, preventing fluid flow through the opening in one direction and an open position in which, under the pressure of a fluid (gas or liquid) on one side of the check valve, the flappers rotate from their closed positions so as to allow the fluid to flow through the valve in the opposite direction.

In known check valve arrangements, a stop is provided to limit the rotational movement of the flapper elements as they open. Typically, the stop comprises a stop pin which is mounted to posts arranged on opposed sides of the valve housing opening. The stop pin is spaced from the opening such that when the flappers open, they engage the stop pin.

The flapper elements may impact the stop pin with some considerable force, meaning that the flapper elements must be sufficiently robust to withstand the impact forces and avoid becoming overstressed which might lead to failure of the flapper element. This may mean that the flapper elements may have to be relatively heavy, which may have implications for example in aircraft applications.

The present disclosure relates to a check valve which includes a modified stop construction.

SUMMARY

There is disclosed herein a check valve which comprises a valve housing defining a valve opening, a pair of mounting posts arranged on opposed sides of the valve opening and a hinge pin mounted between the mounting posts. A pair of flapper elements is pivotably mounted to the hinge pin for rotation relative to the housing between an open position in which they permit fluid flow through the respective valve openings and a closed position in which they prevent fluid flow through the valve openings. A stop is mounted between the mounting posts above the hinge pin and extending across the valve opening such that the flapper elements will contact the stop in their open positions. The stop is a coil spring.

In certain embodiments, the coil spring may be a wire spring.

In other embodiments, the coil spring may be a machined spring.

The flapper elements and the coil spring may be configured such that the flapper elements engage the stop in a medial region of the coil spring.

The coil spring may have a variable diameter, with the diameter in the medial region being larger than the diameter in the end regions of the coil spring. In another arrangement, the coil spring may only be provided with turns in a medial region.

In either of the above arrangements, the flapper elements may have a planar upper surface region for engaging the medial region of the coil spring.

In other embodiments, the coil spring may have a constant diameter. The flapper elements have a raised medial region, for example a convexly curved medial region for engaging the medial region of the coil spring.

The ends of the coil spring may be received within respective bores such as to be rotatable in the bores about the spring axis.

The ends of the coil spring may be received in the respective bores with so as to be rotatable transversely with respect to the spring axis.

In one arrangement, the end of the coil spring may be rounded and be received within a rounded, flaring bore recess.

In an alternative arrangement, the end of the coil spring may be formed with a transverse groove having a rounded base, and the bore is provided with a pin extending vertically thereacross, the pin being received within the groove.

The disclosure also extends to a method of assembling a check valve as described above, the method comprising axially compressing the coil spring, positioning the coil spring between the mounting posts and releasing the coil spring such that it moves into engagement with the mounting posts.

Some embodiments of the disclosure will now be described by way of example only with reference to the accompanying drawings in which:

DETAILED DESCRIPTION

Figure 1:
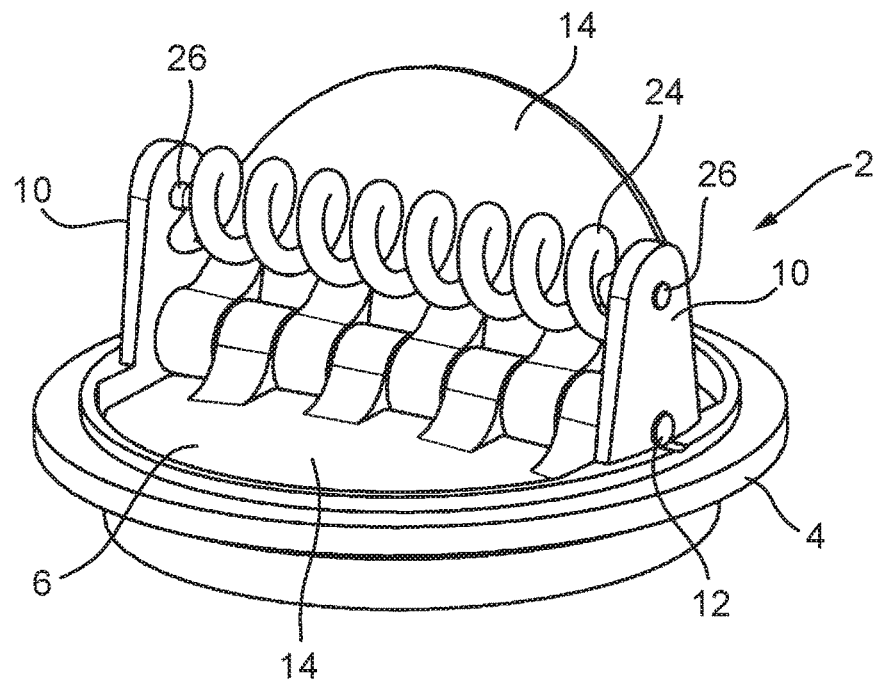
FIG. 1 shows a perspective view of a first embodiment of check valve in accordance with this disclosure.
Figure 2:
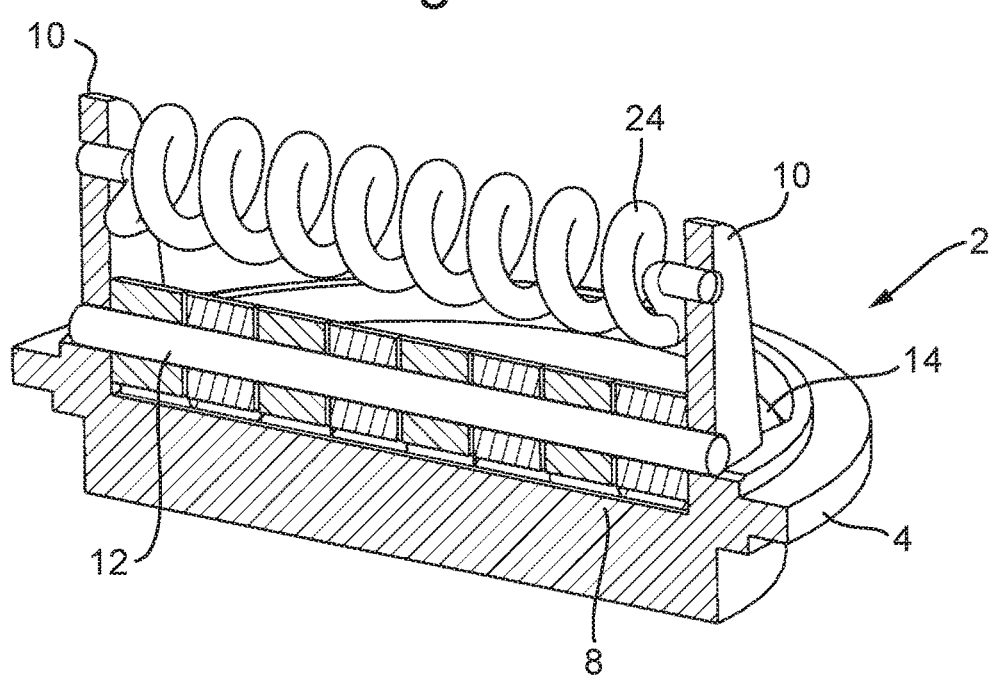
FIG. 2 shows a central vertical cross section through the check valve of FIG. 1.
Figure 3:
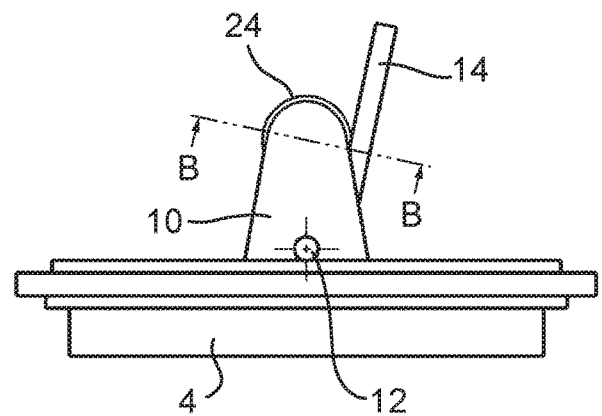
FIG. 3 shows a side view of the check valve of FIG. 1.

A first embodiment of check valve 2 in accordance with this disclosure is illustrated in FIGS. 1 to 4.

The check valve 2 comprises a valve housing 4 for mounting in a pipe, duct or the like. The valve housing 4 comprises a valve opening 6 in the form of a pair of generally D-shaped openings 6 which are separated by a central web 8 of the valve housing 4.

A pair of mounting posts 10 extend upwardly from the valve housing 4. The mounting posts 10 may be integrally formed, for example cast, with the valve housing 4. Alternatively, the mounting posts 10 may be separately formed from the valve housing 4 and mounted thereto by suitable means.

A hinge pin 12 is mounted between the mounting posts 10 above the central web 8. As shown, the hinge pin 12 is a unitary pin, but it may be formed in one or more parts suitably joined together. The hinge pin 12 may be retained to the mounting posts 10 in any convenient manner.

The valve openings 6 are closed by a pair of generally D-shaped flapper elements 14 which are pivotally mounted to the hinge pin 12 by mounting lugs 16. Each flapper element 14 has 4 mounting lugs 16, the mounting lugs 16 of the respective flapper elements being arranged in an alternating fashion on the hinge pin 12.

The flapper elements 14 are received in a recess 18 formed in one face 20 of the valve housing 4, the recess 18 having a peripheral flange (not shown) against which the periphery of the flapper elements 14 seat in the closed position. The hinge end 22 of each flapper element 14 also seats against the valve housing web 8 in the closed position, so that the flapper elements 14 close the valve openings 6. As described so far, the construction of the check valve is conventional.

The check valve 2 is further provided with a stop 24 mounted between the mounting posts 10. In this embodiment, the stop 24 is in the form of a wire coil spring 24 having a constant coil diameter D along its length. The coil spring 24 has mounting sections 26 at its ends, aligned along the longitudinal axis A of the coil spring 24. The end sections 26 are received in bores 28 formed in the upper ends of the mounting posts 10. The bores 28 are sized to be just slightly larger in diameter than the diameter of the coil spring wire in the end sections 26 of the coil spring 24 such that the coil spring end sections 26 may rotate about the longitudinal axis A of the spring 24 in the bores 28 thereby reducing the likelihood of irregular wear of the components.

Figure 4:
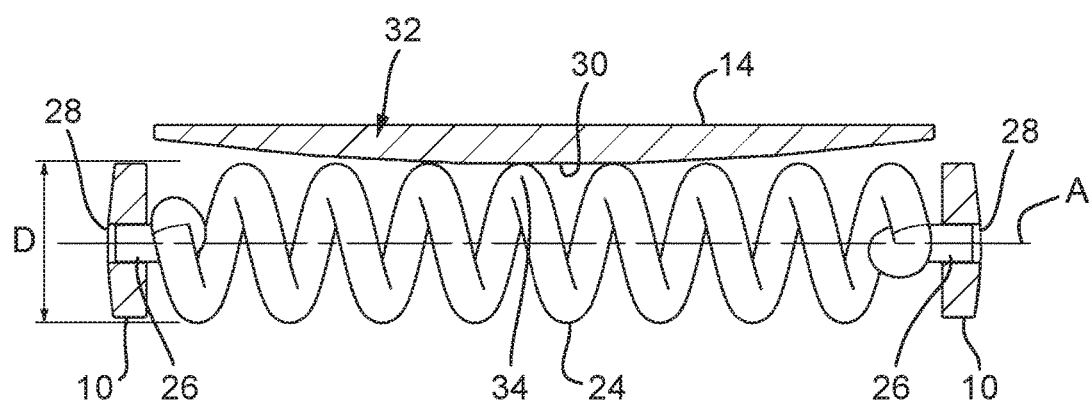
FIG. 4 shows a sectional view along the line B-B of FIG. 3.

In this embodiment, the flapper elements 14 are generally plate like, but, as can be seen from FIG. 4, the upper surface 30 of the flapper element 14 (i.e. that facing away from the valve opening 6 when the flapper element 14 is closed) is convexly curved. In this embodiment, the upper surface 30 is smoothly curved over the entire width of the flapper element, but this is not essential, and it may be that only a medial section 32 of the upper surface 30 is so formed.

The effect of the curvature of the flapper element upper surface 30 is seen in FIG. 4. The curvature means that the flapper element 14 does not contact the coil spring 24 along the entire length of the coil spring 24, but only in a medial section 34 thereof. This means that the coil spring 24 is able better to deflect upon impact of the flapper element 14, thereby better dissipating the impact energy. It will be appreciated that as the coil deflects, a central turn of the coil spring 24 will deflected first, after which turns adjacent the central turn will engage the flapper element upper surface 30. The energy of the impact force is therefore converted into deflection and movement of the respective turns of the coil spring 24. The damping effect will be best where the impact is asymmetrical (i.e. where one flapper element 14 impacts the coil spring 24 before the other. However, this is what mostly will happen in practice.

In a variation of this arrangement, instead of a curved upper surface 30, the medial section 32 of the upper surface 30 of the flapper element may simply be raised with respect to the laterally adjacent sections of the upper surface to create the desired engagement.

Figure 5:
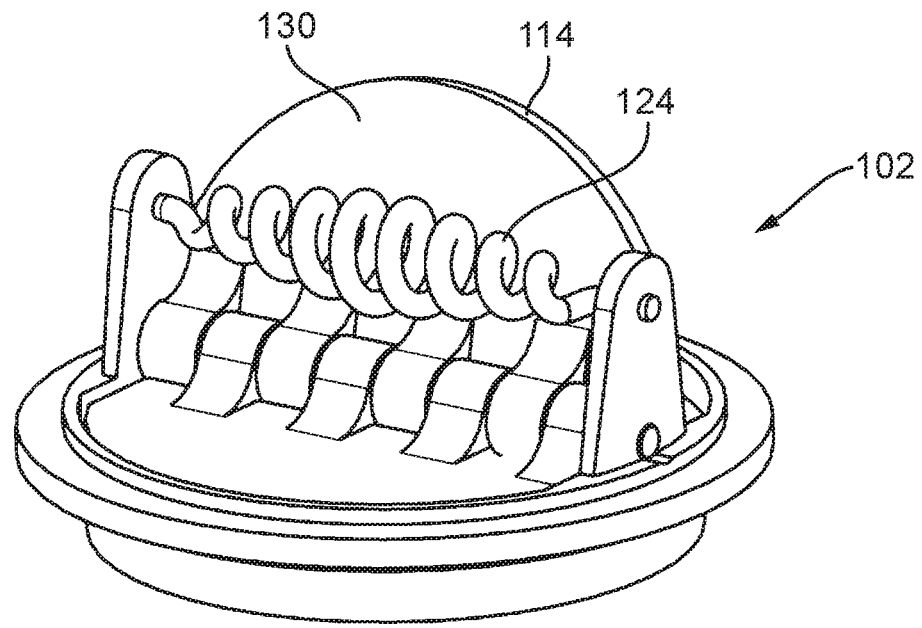
FIG. 5 shows a perspective view of a second embodiment of check valve in accordance with this disclosure.
Figure 6:
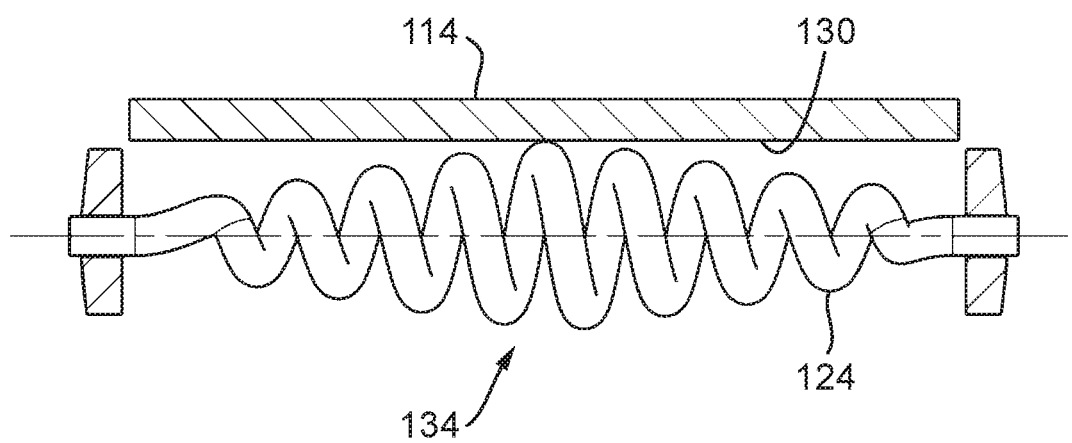
FIG. 6 shows a sectional view through the check valve of FIG. 5, along a line corresponding to the line B-B of FIG. 4.

A second embodiment of the disclosure will now be described with reference to FIGS. 5 and 6.

The general construction of the check valve 102 of the second embodiment is similar to that of the first embodiment, so only the differences between the check valve 102 of this embodiment and the check valve 2 of the first embodiment will be discussed.

In this embodiment, the stop is also in the form of a coil spring 124. However, the coil diameter D of the spring 124 varies along its length, being a maximum in the medial region 134 of the coil spring and reducing toward the end regions 126 of the coil spring.

This construction simplifies the construction of the flapper element 114 in that its upper surface 130 may be planar as shown, contact between the flapper element 114 and the medial section 134 of the coil spring 124 being assured by virtue of the varying diameter of the coil spring 124.

Figure 7:
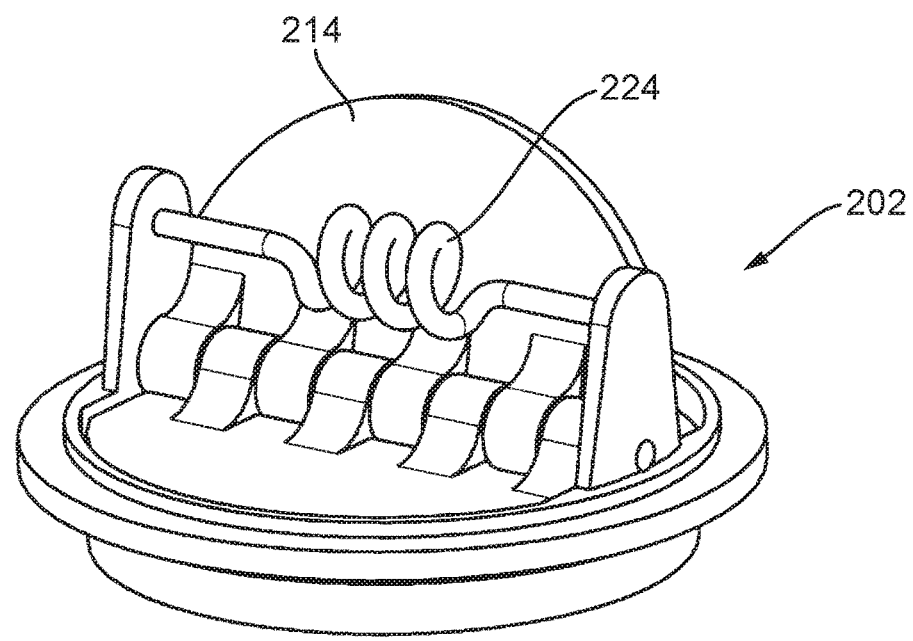
FIG. 7 shows a perspective view of a third embodiment of check valve in accordance with this disclosure.
Figure 8:
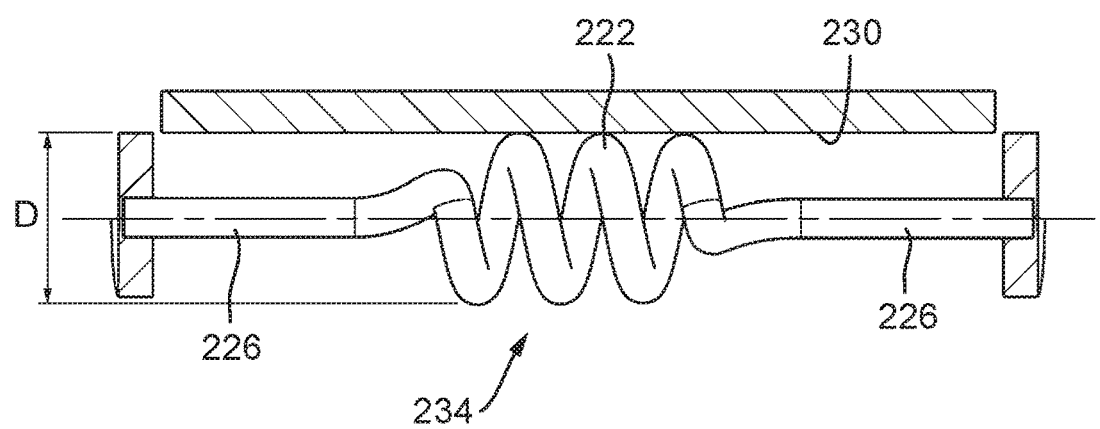
FIG. 8 shows a sectional view through the check valve of FIG. 7, along a line corresponding to the line B-B of FIG. 4.

A third embodiment of the disclosure will now be described with reference to FIGS. 7 and 8.

The general construction of the check valve 202 of the third embodiment is also similar to that of the first embodiment, so only the differences between the check valve 202 of this embodiment and the check valve 2 of the first embodiment will be discussed In this embodiment, the stop is also in the form of a coil spring 224. In this embodiment, turns 222 are only provided in a medial region 234 of the coil spring 224, with the coil spring 224 having elongated end mounting regions 226. The coil diameter D of the medial region 234 is constant.

The flapper element 214 is similar to that of the second embodiment, having a planar upper engagement surface 230. The provision of coils turns only in the medial region 234 of the coil spring 234, however, ensures that there is contact with the flapper elements 214 only in that medial region 234.

Figure 9:
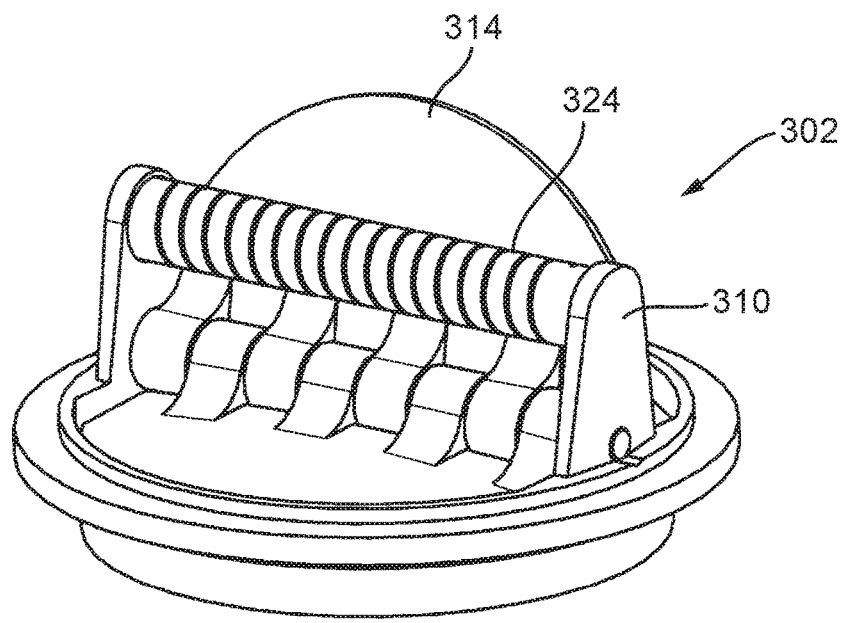
FIG. 9 shows a perspective view of a fourth embodiment of check valve in accordance with this disclosure.
Figure 10:
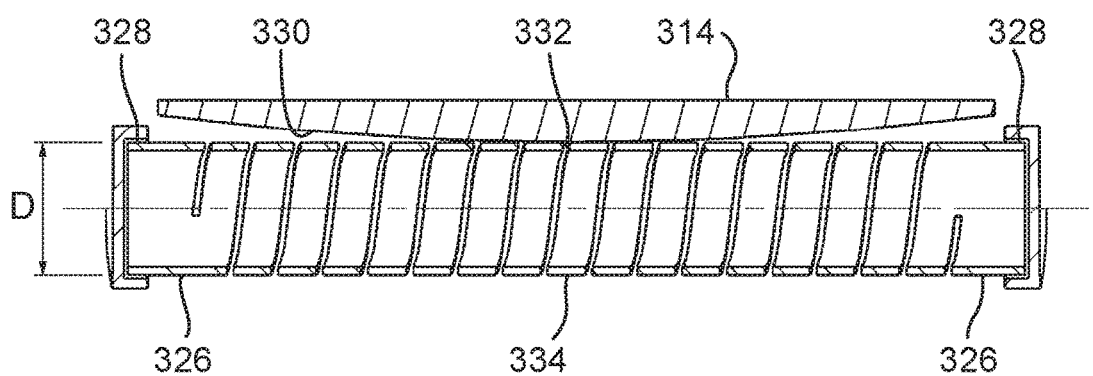
FIG. 10 shows a sectional view through the check valve of FIG. 9, along a line corresponding to the line B-B of FIG. 4.

A fourth embodiment of the disclosure will now be described with reference to FIGS. 9 and 10.

The general construction of the check valve 302 of the third embodiment is also similar to that of the first embodiment, so only the differences between the check valve 302 of this embodiment and the check valve 2 of the first embodiment will be discussed.

In contrast to the first embodiment, the stop 324 in this embodiment is formed as a machined spring 324. Machined springs are coil springs in which instead of the turns of the coil being made from wire, the turns are machined out of a tubular blank.

In this embodiment, the spring diameter D is constant along the length of the spring 324. The end regions 326 of the spring 324 are received in pockets 328 formed in the mounting posts 310.

As in the first embodiment, the upper surface 330 of the flapper element 314 is convexly curved so as to ensure contact of a medial region 332 of the flapper element 314 with the medial section 334 of the spring 324. The upper surface 330 of the flapper element 314 may be shaped appropriately to provide the requisite area of contact with the spring 324.

Compared to a wire spring, a machined spring 324 may provide a better contact between the flapper element 314 and the spring 324, depending on the shape of the upper surface 330 of the flapper element 314. The spring 324 may be machined to provide the appropriate lateral resilience by controlling the width and thickness of the coil.

In the various embodiments described above, the spring ends 26, 126, 226, 326 are received in bores or pockets in the mounting posts. The sizing of the spring ends and the bores or pockets will allow the spring ends to rotate about the spring axis A to prevent uneven wear on the spring or mounting posts.

Lateral deflection of the springs will shorten the length of the spring length by a relatively insignificant distance compared to its side deflection. However, after the spring deflects laterally, the spring ends 26, 126, 226, 326 will no longer be coaxial with the central, deflected region of the spring. This will create a bending force on the mounting bores for the spring ends, which may cause stresses which can damage the mounting posts.

In further embodiments of the disclosure, therefore, the mounting of the springs may be modified so as to permit rotation of the spring ends relative to the spring mountings.

Figure 11:
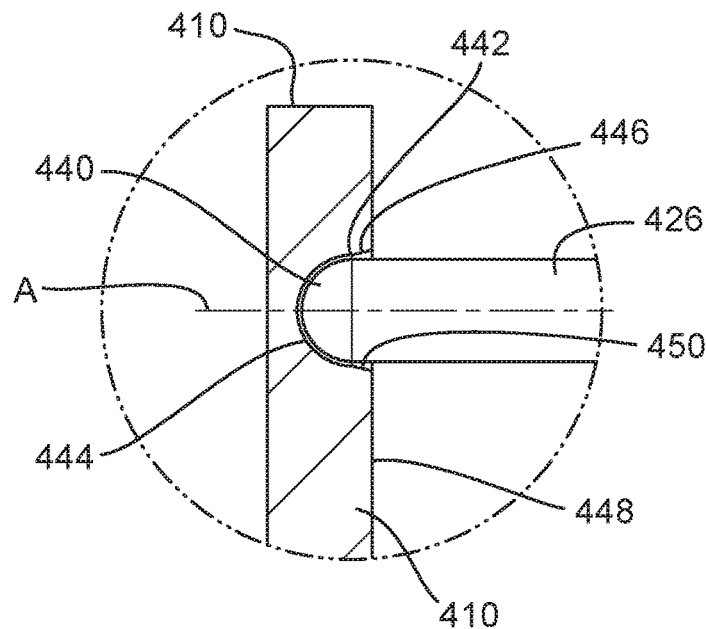
FIG. 11 shows a part sectional view of a detail of a fifth embodiment of check valve in accordance with this disclosure.

A first such modification is shown in FIG. 11. In this embodiment, the end regions 426 of a coil spring 424 (which may have either a constant or a varying coil diameter as shown in any of FIGS. 1 to 8) is formed with a rounded end 440. The rounded end 440 is received within a flaring closed bore 442 formed in the mounting post 410. The closed bore 442 has a rounded base portion 444 having a radius of curvature slightly larger than that of the rounded end 440 of the coil spring 424. It further has a flared mouth portion 446 which opens onto the inner surface 448 of the mounting post 410. A gap 450 is thereby created between the spring end 440 and the flared pocket portion 446, which will allow the end regions to rotate out of the spring axis A for example in a direction D in a plane extending transversely, for example perpendicularly, to the longitudinal axis A of the spring when impacted by the flapper elements 414. This will act to avoid potentially damaging bending stresses being transmitted into the mounting post 410.

Figure 12:
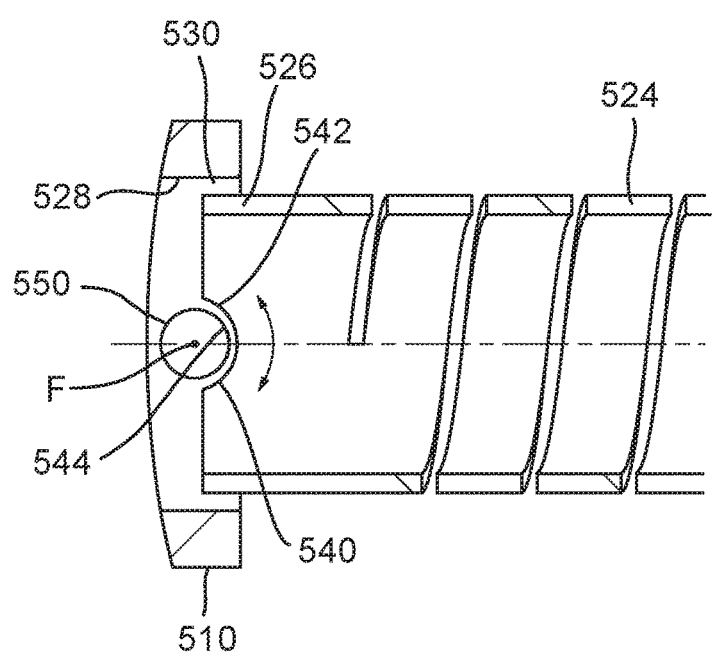
FIG. 12 shows a part sectional view of a detail of a sixth embodiment of check valve in accordance with this disclosure.

A second such modification is shown in FIG. 12. In this embodiment, the end regions 526 of a machined spring 524 are received within respective bores 528 in the mounting posts 510. A clearance 530 is provided between the bore 528 and the end region 526.

Each end region 526 is provided with a transverse groove 540 extending diametrically across its free end. As can be seen, the groove 540 has a curved or rounded base 542.

A pin 544 is fixedly mounted within vertically aligned bores in the mounting posts 510. The pin 544 is in this embodiment circular in cross section and has an outer surface whose diameter is slightly smaller than the radius of curvature of the groove base 542. This, together with the clearance 530 will allow the ends 526 of the spring 524 to rotate in a direction E around the pin axis F, i.e. transversely to the longitudinal axis of the spring 524, when the spring 524 is impacted by a flapper element. This arrangement also prevents bending stresses being transmitted into the mounting posts 510.

Other arrangements which provide a rotatable joint at the spring mounting also fall within the scope of this disclosure.

The assembly of the various embodiments of check valve described above is very simple. To install the stop spring 24, etc., all that is required is that the spring 24 be compressed lengthwise, suitably positioned between the bores or pockets in the mounting posts 10 and then released. The resilience of the spring 24 will retain it in the mounting posts without any additional retaining element being necessary. This is advantageous from a safety and reliability point of view.

It will be appreciated that various modifications may be made to the embodiments discussed above without departing from the scope of the disclosure. For example, it would be possible in other embodiments to vary both the diameter of the spring and curve the engaging surface of the flapper element.

The invention claimed is:

1. A check valve comprising:
   a valve housing defining a valve opening;
   a pair of mounting posts arranged on opposed sides of the valve opening;
   a hinge pin mounted between the mounting posts;
   a pair of flapper elements pivotably mounted to the hinge pin for rotation relative to the housing between an open position in which they permit fluid flow through the valve opening and a closed position in which they prevent fluid flow through the valve opening; and
   a stop mounted between the mounting posts above the hinge pin and extending across the valve opening such that the flapper elements will move into contact with the stop in their open positions; wherein
   the stop is a coil spring.

2. The check valve as claimed in claim 1, wherein the coil spring is a wire spring.

3. The check valve as claimed in claim 1, wherein the coil spring is a machined spring.

4. The check valve as claimed in claim 1, wherein the flapper elements and the coil spring are configured such that the flapper elements engage the coil spring in a medial region of the coil spring.

5. The check valve as claimed in claim 4 wherein the coil spring has a variable diameter, with the diameter in the medial region being larger than the diameter in end regions of the coil spring.

6. The check valve as claimed in claim 4, wherein the coil spring has turns only in a medial region.

7. The check valve as claimed in claim 5, wherein the flapper elements have a planar upper surface region for engaging the medial region of the coil spring.

8. The check valve as claimed in claim 1, wherein the coil spring has a constant diameter.

9. The check valve as claimed in claim 7, wherein flapper elements have a raised medial region for engaging the medial region of the coil spring.

10. The check valve as claimed in claim 8, wherein spring engaging surfaces of the flapper elements are convexly curved.

11. The check valve as claimed in claim 1, wherein ends of the coil spring are received within respective bores of the mounting posts such as to be rotatable in the bores about a longitudinal axis of the spring.

12. The check valve as claimed in claim 1, wherein ends of the coil spring are mounted in respective bores of the mounting posts so as to be rotatable transversely with respect to a longitudinal axis of the spring.

13. The check valve as claimed in claim 12, wherein the ends of the coil spring are rounded and are received within a rounded, flaring bore recess.

14. The check valve as claimed in claim 12, wherein the end of the coil spring is formed with a transverse groove having a rounded base, and the bore is provided with a pin extending vertically thereacross, the pin being received within the groove.

15. A method of assembling a check valve, the check valve including: a valve housing defining a valve opening;

a pair of mounting posts arranged on opposed sides of the valve opening; a hinge pin mounted between the mounting posts; a pair of flapper elements pivotably mounted to the hinge pin for rotation relative to the housing between an open position in which they permit fluid flow through the valve opening and a closed position in which they prevent fluid flow through the valve opening; and a stop mounted between the mounting posts above the hinge pin and extending across the valve opening such that the flapper elements will contact the stop in their open positions; wherein the stop is a coil spring; the method comprising:

axially compressing the coil spring, positioning the coil spring between the mounting posts; and releasing the coil spring such that it moves into engagement with the mounting posts.

\* \* \* \* \*